US011411868B2

(12) United States Patent
Gouache et al.

(10) Patent No.: US 11,411,868 B2
(45) Date of Patent: Aug. 9, 2022

(54) BATCH ORIENTED SERVICE CHAINING METHOD AND CORRESPONDING DEVICES AND COMPUTER PROGRAM

(71) Applicant: INTERDIGITAL CE PATENT HOLDINGS, Paris (FR)

(72) Inventors: Stephane Gouache, Cesson Sevigne (FR); Charles Salmon-Legagneur, Rennes (FR); Jean Le Roux, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/191,570

(22) Filed: Nov. 15, 2018

(65) Prior Publication Data

US 2019/0149467 A1    May 16, 2019

(30) Foreign Application Priority Data

Nov. 15, 2017    (EP) .................................... 17306588

(51) Int. Cl.
| | |
|---|---|
| *H04L 45/74* | (2022.01) |
| *H04L 45/30* | (2022.01) |
| *G06F 9/38* | (2018.01) |
| *G06F 9/54* | (2006.01) |
| *H04L 49/102* | (2022.01) |
| *H04L 45/00* | (2022.01) |

(52) U.S. Cl.
CPC ............ *H04L 45/74* (2013.01); *G06F 9/3877* (2013.01); *G06F 9/544* (2013.01); *H04L 45/00* (2013.01); *H04L 45/30* (2013.01); *H04L 49/102* (2013.01)

(58) Field of Classification Search
CPC ......... H04L 45/74; H04L 45/00; H04L 45/30; H04L 49/102; G06F 9/3877
USPC ........................................................ 709/245
See application file for complete search history.

(56) References Cited

U.S. PATENT DOCUMENTS

| | | | |
|---|---|---|---|
| 2004/0034743 A1* | 2/2004 | Wolrich | ................ H04L 49/901 |
| | | | 711/132 |
| 2014/0226662 A1 | 8/2014 | Frost et al. | |
| 2015/0281173 A1 | 10/2015 | Quinn et al. | |
| 2016/0112309 A1 | 4/2016 | Hikichi | |
| 2016/0182380 A1* | 6/2016 | Mehra | ................. H04L 45/7453 |
| | | | 709/226 |
| 2016/0330111 A1* | 11/2016 | Manghirmalani | ...... H04L 45/38 |

(Continued)

FOREIGN PATENT DOCUMENTS

| | | |
|---|---|---|
| KR | 20160116621 | 10/2016 |
| WO | WO2016041606 | 3/2016 |

*Primary Examiner* — David R Lazaro
*Assistant Examiner* — Zia Khurshid
(74) *Attorney, Agent, or Firm* — Volpe Koenig

(57) ABSTRACT

A method and device for packet processing implemented by a packet processing device is described. The packet processing device is connected to a communication network from which the packet processing device receives and/or transmits packets in a context of network service chaining. The method includes obtaining a set of packets, each packet of the set of packets comprising at least one specific characteristic; grouping the packets of the set of packets according to the at least one specific characteristic, and delivering at least two subsets of packets; and adding, to at least one of the subsets of packets, metadata common to the packets of the at least one subset of packets.

13 Claims, 5 Drawing Sheets

(56) References Cited

U.S. PATENT DOCUMENTS

| | | |
|---|---|---|
| 2017/0048083 A1 | 2/2017 | Guan |
| 2017/0048815 A1 | 2/2017 | Clarke et al. |
| 2017/0222922 A1* | 8/2017 | Zlatokrilov ............. H04L 45/74 |
| 2018/0359329 A1* | 12/2018 | Vacaro ................ H04L 67/2819 |

* cited by examiner

BATCH ORIENTED SERVICE CHAINING METHOD AND CORRESPONDING DEVICES AND COMPUTER PROGRAM

1. REFERENCE TO RELATED EUROPEAN APPLICATION

This application claims priority from European Patent Application No. 17306588.9, entitled "BATCH ORIENTED SERVICE CHAINING METHOD AND CORRESPONDING DEVICES AND COMPUTER PROGRAM", filed on Nov. 15, 2017, the contents of which are hereby incorporated by reference in its entirety.

2. FIELD

The disclosure relates to packet processing. More specifically, the disclosure relates to packet processing in a service chaining context.

3. BACKGROUND

Network service chaining, also known as service function chaining (SFC) may be defined as the capability to create a service chain of connected network services or functions (such as L4-7 like firewalls, network address translation [NAT], intrusion protection) and connect them in a virtual chain of process. This capability can be used by network operators to set up suites or catalogs of connected services that enable the use of a single network connection for many services, with different characteristics.

The service chaining concept applies both to services being implemented within a network of distinct machines (computers or network elements) and/or within a single machine hosting a virtual network interconnecting a number of virtual functions. In such architecture, several networks functions (Network functions) are available, these networks functions being used to process the packets thru a chain.

One common way to enable a service chaining capability is to attach service chaining metadata to network packets so that the metadata follows the same path as packet processing.

Usually, at the entrance into a service chain, a service classifier attaches initial metadata (e.g. where the packet comes from, the user, the SLA [Service Level Agreement]) which is then used to route the packets through the various services of the service chain so as to enable the management of services or treatments linked to the packet. When a network functions wants to modify the service chain (e.g. for one or several packets), it simply has to modify the metadata accordingly and the packet is processed by the following function dynamically. Finally at the exit of the service chain, when all the necessary functions have been implemented, the metadata is removed and the packet is forwarded through the network.

With this way of managing packets, it is thus possible to dynamically process the packets for providing adapted behavior as a function of the content, origin, destination or other features of the packets.

While being complete in terms of services, the main drawback of this approach (which is based on the modification of the metadata by the network functions along the service chain) is to imply lot of cache invalidations (potentially one per packet) each time a network function modifies the packet's metadata.

Cache invalidation is a process in a computer system whereby entries in a cache memory are replaced or removed. It can be done explicitly, as part of a cache coherence protocol or implicitly while processing data. For a processor, it consists in changing a memory location and then invalidating the cached values of that memory location across the rest of the computer system. In a service chaining process, such a situation occurs each time the metadata of the packet changes, since it implies changing the resources required for implementing the next service (network function) for the packet, the next service being very often different from the current service which was used for the packet. This implies that new resources are loaded (and added to the cache) for implementing the next network function (next service). As a consequence, the time spent to load and unload resources to and from the cache increases the overall time for processing the packets and thus increases the latency time. The result is a significant slowdown of the simple process of forwarding packets between network functions.

Thus, the present disclosure has been devised with the foregoing in mind.

4. SUMMARY

The disclosed technique can allow limiting the effect of cache invalidation. Indeed, it is proposed, while inserting and/or modifying the metadata attached to packets, to group these packet as a function of the metadata that have to be added and/or updated. Several embodiments of the proposed techniques may be implemented, as explained herein after.

According to a first aspect, the disclosure relates to a method for packet processing, implemented by a Packet Processing Device configured to be connected to a communication network from which said Packet Processing Device receives and/or transmits packets in a context of network service chaining. The method comprising:
 obtaining a set of packets, the packets of said set of packets comprising at least one specific characteristic;
 first grouping said packets of said set of packets according to said at least one specific characteristic, delivering at least two subsets of packets.
 adding, to at least one of said subsets of packets, metadata common to the packets of said at least one subset of packets.

Thus the proposed method can allow increasing the overall speed of packets processing in a service chaining implementation and can globally assign metadata.

According to a specific feature, the method comprises, after adding, metadata, sequentially processing said at least two subsets of packets.

Thus, grouping the packets in subsets and assigning directly metadata to each subset can allow processing the subsets of packets as a whole object which does not necessitate cache invalidation for each packet of the subset.

According to a specific feature, said grouping comprises modifying at least one order of pointers of the packets of said set of packets, within a ring data structure stored in a shared memory area of the packet processing device, so that the pointers of the packets having a common characteristic are concomitant within the ring data structure.

Thus, this can allow minimizing the operation made on the packets of the subset since it not essential to move the packets themselves, but only to move the references (pointers) of the packets, which is faster.

According to a specific feature, the method further comprises, after sequentially processing said at least two subsets of packets grouped, a second grouping of said packets of said set of packets as a function of at least a second specific characteristic, delivering at least one further subset of packets.

Thus, a network function (or network service of the chain) can group the packets at two different moments: before processing and after processing, so that the next network function just has to process the subset(s) and possibly to group the subset(s) again after processing. According to the disclosure, the grouping of packets in subset(s) can be done either before or after the processing these packets by the network function(s).

According to a specific embodiment, the method comprises, after said grouping, adding, for at least one grouped subset, of a record containing metadata common to the packets of said current subset of packets.

According to a specific embodiment, said record containing said metadata is added within a ring data structure of pointers, comprising addresses of each packets of said current subset of packets in a shared memory area of the packet processing device.

According to a specific embodiment, the method comprises, after grouping, adding, within a ring data structure of pointers, for at least one subset of packets, a record containing a pointer to a shared memory area of the packet processing device, the shared memory area comprising metadata common to the packets of said subset of packets.

According to a specific feature, said shared memory area comprising metadata is organized in the form of a table comprising records of metadata, each record the table comprising metadata of a given subset of packets.

According to a specific feature, said specific characteristic belong to the group comprising:
  a source address of the packets;
  a destination address of the packets;
  a destination port of the packets;
  a Virtual Local Area Network identifier;
  a Virtual Extensible LAN identifier;
  a tunnel identifier;
  a protocol associated to the packets;
  existing metadata of the packets.

According to a specific feature, said Packet Processing Device comprises at least one processor comprising at least two cores, said grouping being implemented so that a first subset of packets is processed by a first core and a second subset of packets is processed by a second core.

Thus, the processing of said subsets of packets can balanced between the cores of the processor, each core being mainly in charge of a single subset.

The present disclosure is also related to a Packet Processing Device configured to be connected to a communication network from which said Packet Processing Device receives and/or transmits packets in a context of network service chaining, the device being comprising a processor and a memory, wherein said processor is configured for:
  obtaining a set of packets, each packet of said set of packets comprising at least one specific characteristic;
  grouping said packets of said set of packets according to said at least one specific characteristic, delivering at least two subsets of packets;
  adding to at least one of said subsets of packets, metadata common to the packets of at least one subset of packets.

According to a specific feature, said processor is configured for sequentially processing said at least two subsets of packets.

According to a specific feature, said processor is configured so that said grouping comprises at least one step modifying an order of pointers to the packets of said set of packets, within a ring data structure stored in a shared memory area of the packet processing device, so that the pointers of the packets having a common characteristic are concomitant within the ring data structure.

According to a specific feature, said processor is configured so that, after sequentially processing said at least two subsets of packets grouped, a second grouping of said packets of said set of packets as a function of at least a second specific characteristic, delivering at least one subset of packets.

According to a specific feature, said processor is configured so that after said grouping, at least one adding, for at least one grouped subset, of a record containing metadata common to the packets of said current subset of packets.

According to a specific feature, said processor comprises at least two cores, said configuration for grouping being implemented so that a first subset of packets is processed by a first core and a second subset of packets is processed by a second core.

The present disclosure is also related to a computer program product downloadable from a communication network and/or recorded on a medium readable by a computer and/or executable by a processor, comprising program code instructions for implementing the method as described above.

The present disclosure also concerns a non-transitory computer-readable medium comprising a computer program product recorded thereon and capable of being run by a processor, including program code instructions for implementing the method as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

5. BRIEF DESCRIPTION OF THE DRAWINGS

Embodiments of the present disclosure can be better understood with reference to the following description and drawings, given by way of example and not limiting the scope of protection, and in which.

Figure 7A:
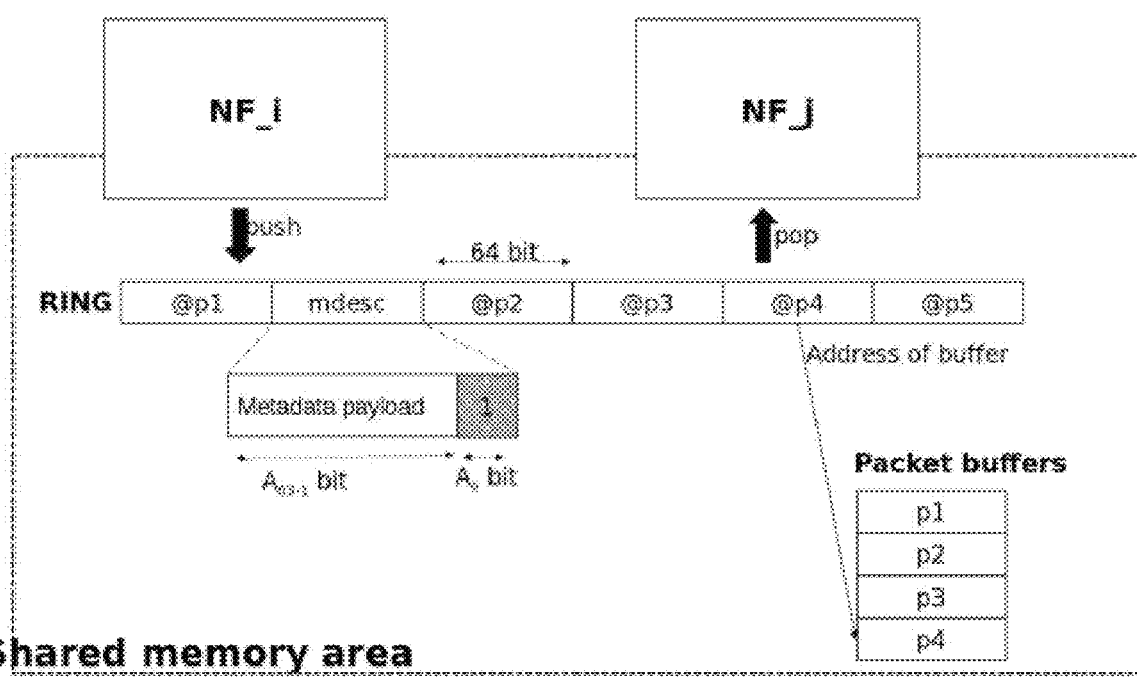
Figure 7B:
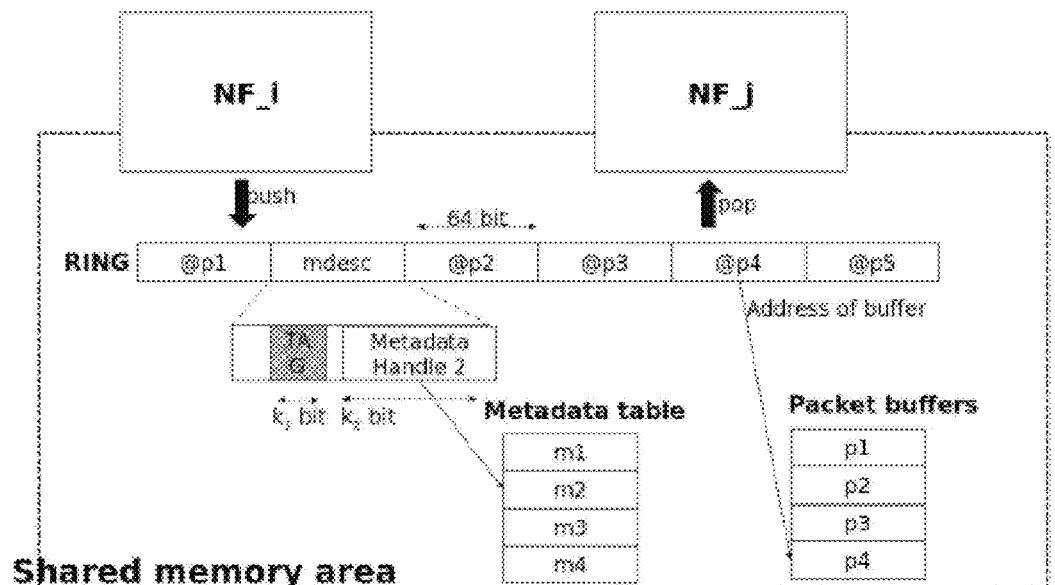
Figure 8:
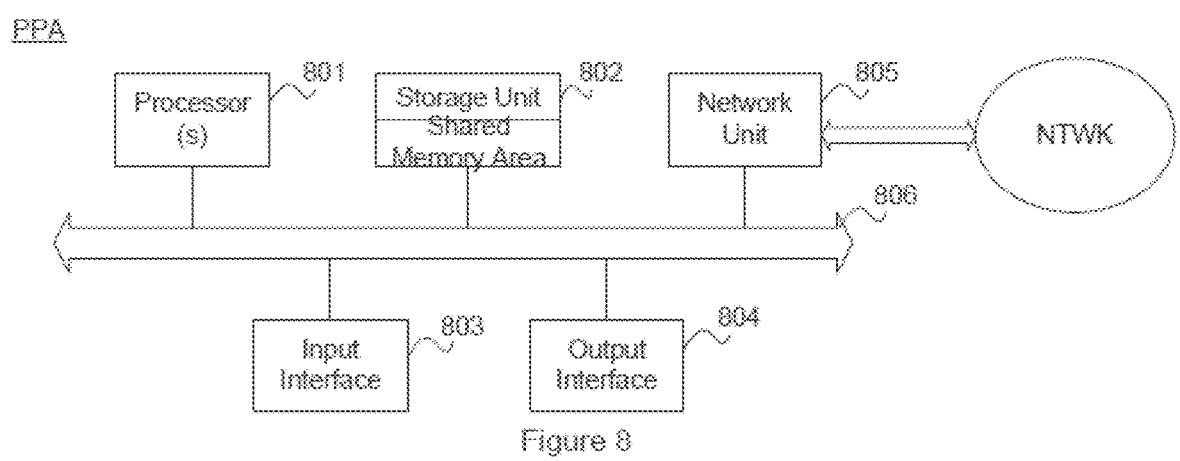

FIGS. 6a, 6b, 6c and 6d respectively show ungrouped (6a), grouped (6b), null packet prepends (6c) and packet piggybacking (6d) according to several embodiments of the present principles;

FIGS. 7a and 7b illustrate two different possibilities of implementing the null packet prepending technique;

FIG. 8 is an illustrative representation of a device for implementing the disclosed technique.

6. DESCRIPTION

6.1. General Principle

The general principle of the disclosure consists in grouping the packets, in a context of service chaining, so as to limit the cache invalidation and thus increasing the processing speed of packets. As described earlier, the addition of a piece of metadata to every packet is the basis mechanism for achieving the flexibility promised by network service chaining. Furthermore, the Network Functions (NFs) have the capability to conditionally modify the subsequent Network Functions (NFs) traversed by a packet by modifying the metadata, resulting in the dynamicity of the service chain. These properties are requirements which the present principles allow preserving.

However, to mitigate the performance hit incurred by network functions modifying the metadata of every packet, it is proposed to manage metadata for a batch of packets such that there is a single cache invalidation for a complete set of grouped packets, instead of a potential cache invalidation for each and every packet during the service chaining.

Figure 1:
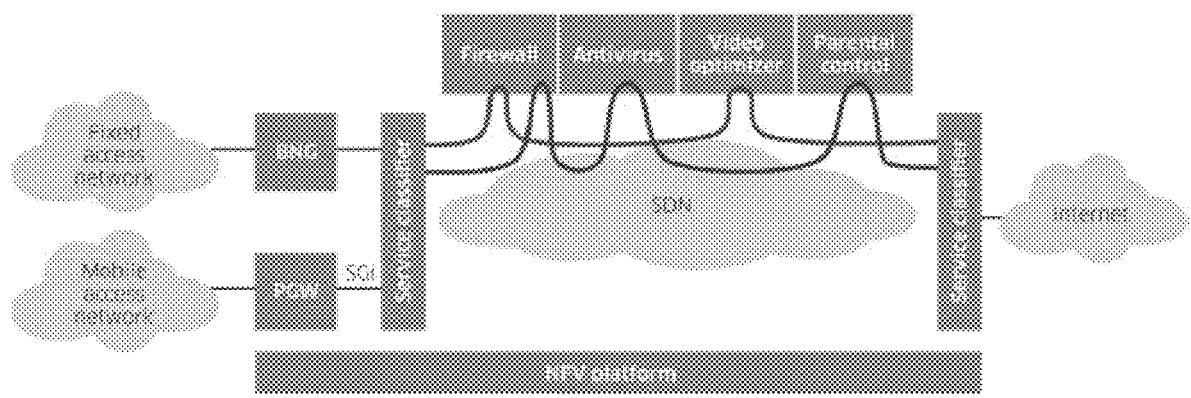
FIG. 1 depicts a network service chaining platform in an exemplary embodiment.

For clarity purposes, FIG. 1 describes an example of service chaining implementation for some services. In FIG. 1, two networks (Fixed access network and Mobile access network) are connected to a NFV (Network Function Virtualization) platform thru a BNG (Broadband Network Gateway) and a PGW (Packet Data Network Gateway) respectively. The later are connected to a service classifier which manages packets coming from these two networks. The service classifier (SC) may add some metadata to the incoming packets so that they are chained to several network functions (or services) (Firewall, Antivirus, Video Optimizer, Parental Control, etc.) and then transmitted to the internet network (after a second service classifier has extracted metadata). The reverse is also true: the service classifier adds metadata to packets coming from the internet network so that they are chained to the different services and then delivered to the fixed access network or the mobile access network (after removal of the metadata by the service classifier). The networks functions are implemented by one or several networks components. In the context of the disclosure, at least two networks functions are implemented by one device, this device being interconnect with a network for receiving and/or transmitting packets. The device comprises at least one processor and at least one storage space comprising a shared memory which is shared between the network function for processing the service chaining.

In order to limit or cancel the cache invalidation, according to a first aspect of the present principles, at least one network function (for example the service classifier or any network function), which is implemented by a network component, is able to group packets to build set of packets that have common characteristics. This set of packets is processed by a network component for implementing a desired network function and is then forwarded to a next (following) network component for implementing a following network function. Several possibilities are offered for grouping the packets, some of which are detailed herein after. Basically, the grouping can be done at the entrance of the service chain (for example by a service classifier) or inside the service chain (by a network component which implements one or more network functions).

The grouping may be accompanied by the adjunction or the modification of metadata, according to several embodiments.

In a first embodiment, the network function may group packets having the same destination (or intended metadata) into a batch and simply forward this batch (after processing of the packets) to the following network function, so as to enable a complete processing of the batch by the following network function.

In a second embodiment, the network function may group packets having the same destination (or intended metadata) into a batch and prepend a single, null sized preamble packet with the desired metadata. Upon receipt of this "special" null sized packet, the next network function will handle all subsequent packets as if they had the same metadata attached. The net effect of transporting a single metadata structure for a batch of packets is that less processing time is wasted retrieving this information, resulting in more processing time available for implementing the actual network function.

In a third embodiment, one piggy-backs the first packet of the batch by encoding the metadata as a "bit field" and inserting it in the higher bits of the packet buffer address carried by the ring buffer.

Figure 2:
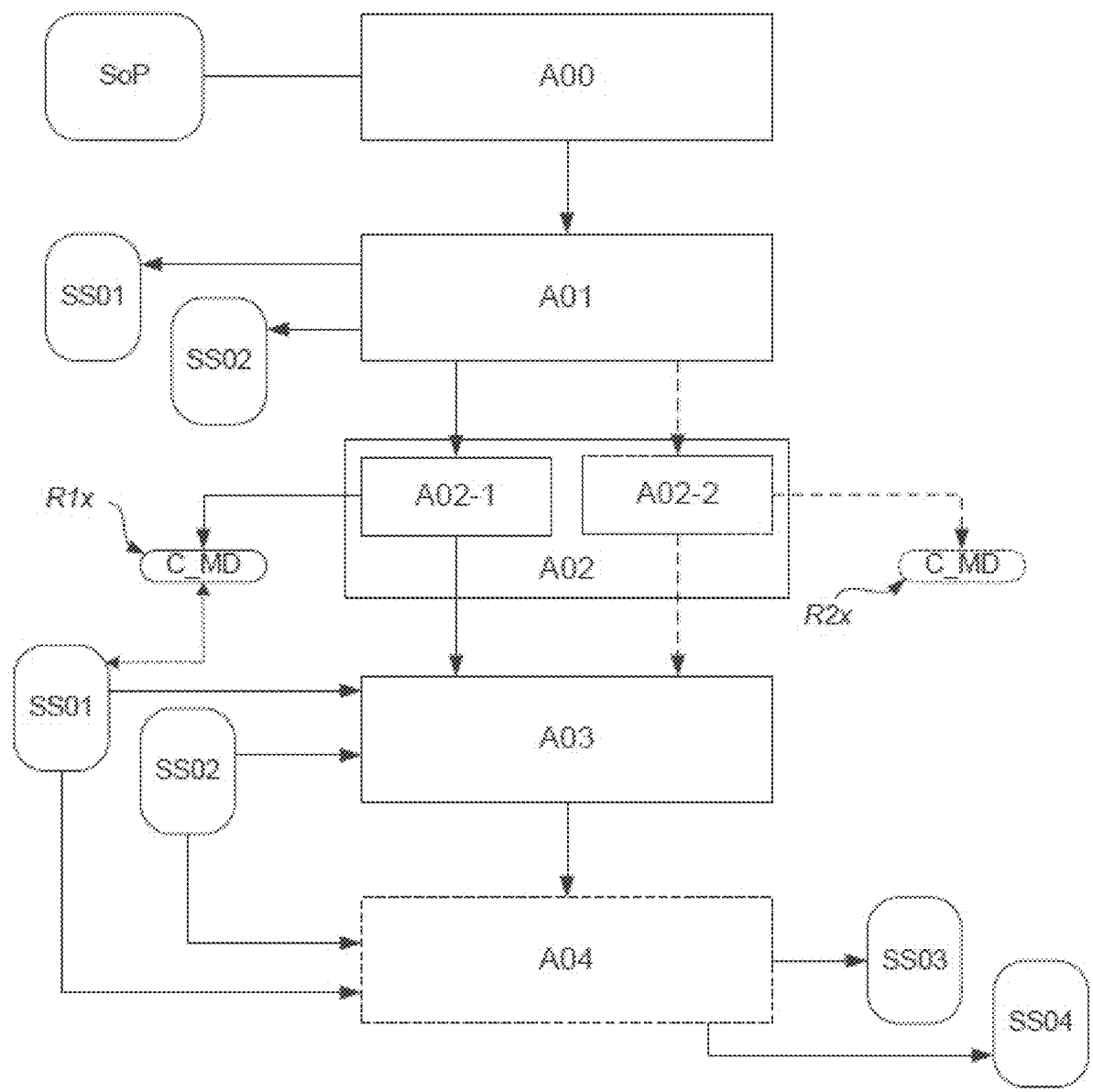
FIG. 2 illustrates a packet processing method according to the present principles.

All these embodiments and their variants are described herein above. These embodiments implement a first step which comprises grouping the packets which have common characteristics together, and then a second step which comprises managing the metadata attached to this group of packets. More specifically, as explained in relation with FIG. 2, the present principles generally relate to a method for packet processing, the method being implemented by a Packet Processing Device (PPA) connected to a communication network (NTWK) from which the Packet Processing Device (PPA) receives and/or transmits packets in a context of network service chaining. The Packet Processing Device (PPA) to which it is referred comprises means for implementing network function (for example by the use of specific modules). The method comprises:

a step for obtaining (A00) a set of packets (SoP), each packet of the set of packets comprising at least one specific characteristic (one or more of a source address of the packets; a destination address of the packets; a destination port of the packets; a protocol associated to the packets; existing metadata of the packets);

a step for grouping (A01) the packets of the set of packets according to the at least one specific characteristic, delivering at least two subsets of packets (SS01, SS02).

The method comprises, after the grouping step (A01), a step for sequentially processing (A03) the at least two subsets of packets (SS01, SS02): this means that the network functions or network modules which implement the method process a first subset, entirely and then a second subset, entirely.

In a preferred embodiment, the grouping (A01) step comprises at least one step for modifying an order of pointers to the packets of the set of packets, within a ring data structure stored in a shared memory area of the packet processing device (PPA), so that the pointers of the packets having a common characteristic are side by side within the ring data structure: the pointers of the packets in a shared memory space are grouped or reordered so that the pointers of the packets which are grouped are side by side in the ring structure, allowing the network function(s) to process the two subsets sequentially.

After the step for sequentially processing (A03) the at least two subsets of packets grouped (SS01, SS02), one may have a second grouping step (A04) of the packets of the set of packets as a function of at least a second specific characteristic, delivering at least two subsets of packets (SS03, SS04).

In an embodiment, after the grouping step (A01), the method comprises at least one adding step (A02-1), for at least one current subset (SS01) of packets, of a record (R1x) containing metadata (C_MD) common to the packets of the current subset of packets. For example, the record (R1x) containing the metadata (C_MD) is added within a ring data structure of pointers, comprising addresses of each packets of the current subset of packets in a shared memory area of the packet processing device (PPA).

In another embodiment after the grouping step (A01), at least one adding step (A02-2), within a ring data structure of pointers, for at least one subset (SS01) of packets, of a record (R2x) containing a pointer to a shared memory area of the packet processing device (PPA), the shared memory area comprising metadata (C_MD) common to the packets of the subset of packets.

As described above, the shared memory area comprising metadata is organized in the form of a table comprising records of metadata, each record the table comprising metadata of a given subset of packets.

6.2. Description
6.2.1. Presentation

As previously exposed, Network service chaining, also known as service function chaining (SFC) is usually defined as the capability to create a service chain of connected network services or functions and connect them in a virtual chain of services.

The service chaining concept applies both to services being implemented within a network of distinct machines (computers or network elements) or within a machine hosting a virtual network interconnecting a number of virtual functions. The main enabler of the service chaining capability is to attach service chaining metadata to network packets so that the metadata follows same path as packet processing.

Figure 3:
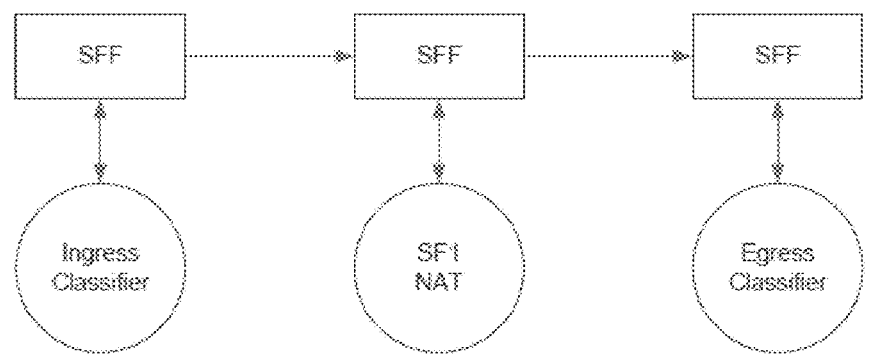
FIG. 3 illustrates an example of service chaining for implementing NAT functionalities.

In IETF/NSH terminology, the element at the entrance and exit of the service chain is called a classifier, a network function is named a service function (SF) and the element responsible for forwarding the packets between the aforementioned elements is called a service function forwarder (SFF). An example of such a chain is shown in the FIG. 3.

The service function forwarder (SFF) forwards the received packets (from an external source) to the ingress classifier which adds metadata to the packets and provides the packets and the added metadata to the SFF. The SFF then provides the packets (with the metadata) to the NAT network function SF1 (which process the packets and provides back the packets to the SFF). The SFF finally provides the packets to the egress classifier which remove metadata of the packets and forwards the packets to the various destinations. In this example, for simplicity, only one network function has been considered (the NAT Network function).

Figure 4:
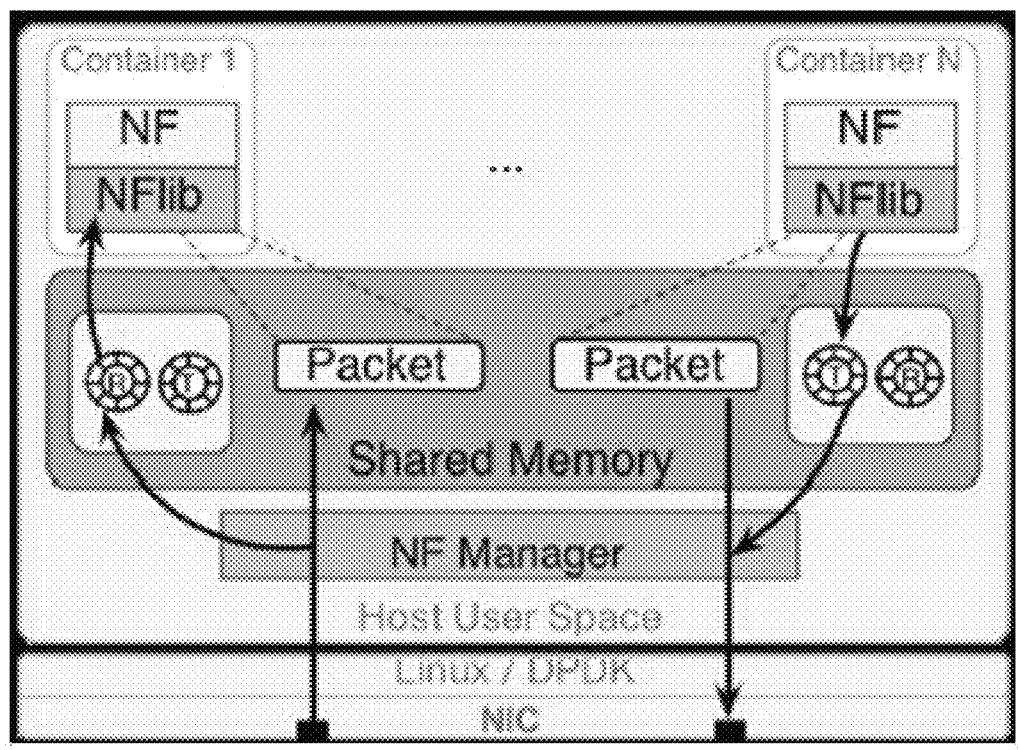
FIG. 4 depicts an OpenNetVM architecture.

While the IETF specification highlights interoperation between physically distinct networking elements, it is also perfectly possible to host a service chain within a single computer, assembling virtual network functions by means of a virtual forwarding function. this is what is proposed by Open NetVM (which is described in FIG. 4).

In the OpenNetVM architecture, the Ingress/Egress classifier and SFF functions are grouped into what is called the NFManager (Network Function manager). Very similarly to what was presented before, packets arriving on a NIC (Network Interface Card) are marked with initial metadata and then forwarded along a service chain until they finally hit the network again.

An example metadata structure is given below.

```
struct pkt_metadata {
uint8_t action;       /* Action to be performed */
uint8_t destination;  /* Where to go next */
uint8_t port;/* Arrival port */
uint8_t source;       /* Who processed the packet last */
uint8_t chain_index;  /* Index of the current step in the service chain*/
};
```

In the above example (which is purely illustrative), the definition of fields is as follows:
  action can be one of {to network, to network function, drop}, determining what to do with the packet;
  destination identifies the next network function or physical port, when the action is 'to network' or 'to Network Function' port identifies the NIC on which the packet arrived;
  source is the identity of the network function that last processed the packet;
  chain index gives the current stage in a predefined service chain.

The metadata is part of the packet structure exchanged between the Network Function Manager and the Network Functions. As shown on the FIG. 4, the network function manager (NFManager) and the network functions (NF) communicate via a shared memory area (Shared Memory). This shared memory area holds both packet buffers, and a number of ring (R, T) containing descriptors of buffers.

Figure 5:
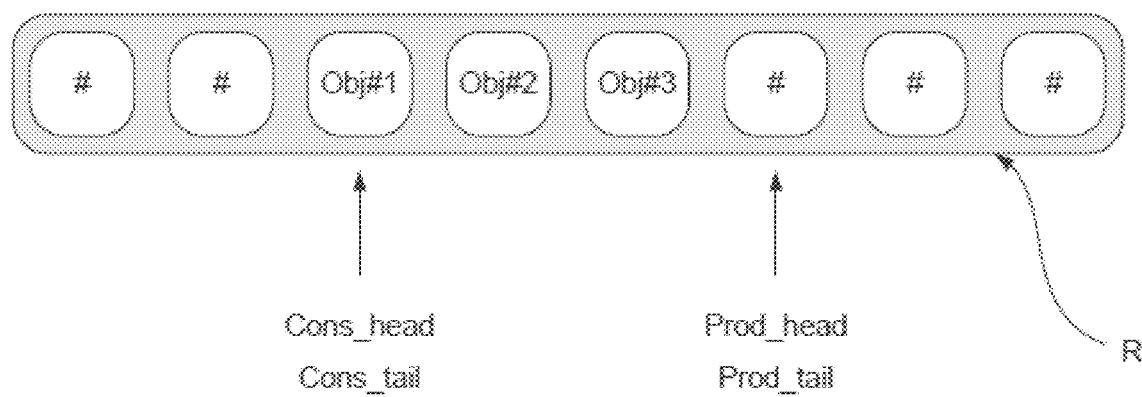
FIG. 5 illustrates the production and the consumption of object in a ring.

In OpenNetVM, each network function has an input (RX) ring and an output (TX) ring. Rings are a fast communication mechanism between processes running on different CPU cores: for example a first core comprises a first container (network component) which implements a first network function and a second core comprises a second container which implements a second network function. The ring comprises addresses of the location of the packets which have to be processed (R) or have been processed (T). The rings thru which the packets are processed are essentially FIFO lists where the entries are pre-allocated in order to achieve faster speed. The ring entries carry the memory address of the packet buffers, thus allowing the manager and network functions to pass each other packets to process. One important property of a ring is that the entries are consumed in the same order that they have been inserted. An illustration of a ring structure is given in FIG. 5. Three packets (Obj #1, Obj #2, Obj #3) are presented in the ring (R). Consumption (Head and Tail) is done on packet (Obj #1), while production (Head and Tail) is done at the end of the queue (after Obj #3). If the consumption is slower than the production, it will thus result in the addition of new packets in the ring.

Passing packet buffers to Network functions allows them to do their manipulation on the packets and update the metadata if needed. For example a network function may decide to send a given packet to a given network function or to direct a given packet to a given output port. The modified packets are returned to the network function manager via the TX ring, allowing it to proceed along the service chain according to the packets' metadata. As previously explained, the modification of metadata of each packet by the Network functions significantly reduces the forwarding performance. An explanation is that every network function or forwarding element (SFF or NFManager) must gain access (read and read/write if modification is needed) to the metadata, involving cache invalidation as the different elements run on different CPU cores.

Therefore, according to the present principles, one proposes a mechanism wherein metadata (carrying the service chaining information) can be sent only once for a batch of packets. By implementing this technique, performance gains can be of at least 20% compared to traditional per packet metadata manipulation. The techniques for achieving these results are described herein above. While OpenNetVM serves as an illustrative example of the proposed techniques, the principles of the disclosure can be applied to any configuration where network functions (or more generally network components) exchange packets via a ring-like structure (i.e. an order preserving data structure).

6.2.2. Grouping

According to the present principles, it is proposed to attach metadata to a batch of packets such that there is a sole piece of metadata-related cache invalidation for a whole batch of packets. For obtaining this result, the network functions group packets having common characteristics (for example destination or intended metadata) into a batch and attach the desired metadata to the batch. What has to be understood in this grouping step is that the incoming packets may or may not already have metadata. When packets already have metadata, they are grouped according to their metadata for delivering at least two subsets of packets, each of them comprising packets that have the same metadata. When packets do not have metadata, they are grouped according to other features, for example the destination address of the packets, the source address, the ports, or other features). In this last situation, the grouping step may be followed by a metadata creation step. This metadata creation step may use conventional method or some of the metadata management techniques proposed herein after (see following section).

Figure 6A:

As an illustrative example, let's consider a NAT function producing a mixture of packets going to the LAN and packets going to the WAN, as depicted in FIG. 6a (e.g. white packets going to the LAN, grey packets going to the WAN).

In a first step that is common to several embodiments, the current network function group (or sort) the packets according to common characteristics (their intended destination or metadata for example). The result of this first step is given in FIG. 6b. This first step has the interesting side-effect that it immediately allows further batch treatment of packets by the current network function to amortize cache misses and context switches, and significantly reduce CPU branch prediction misses.

Figure 6B:
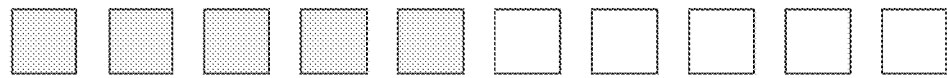
Figure 6C:
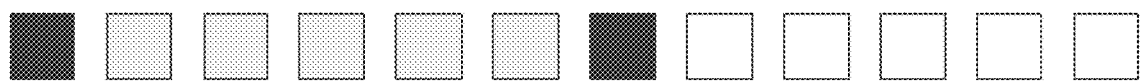

As exposed in FIG. 6b, the result of this first grouping operation is the obtaining of two batches of packets (two subsets of packets), with each of them having common characteristics that allow common processing tasks. Basically, the current network function can process the first batch (subset) of packets (with possible update of the metadata of each packet of this first batch) and then process the second batch (subset) of packets (with possible update of the metadata of each packet of the second batch).

Optionally, before releasing the packets (of the first and second batch) to the next hop (next network function) the current network function may group them again, according to different common characteristics, in order to obtain one or more new batches (one or more new subsets). Thus, in this variant, the processing of the packets is optimized twice: the first time before the treatments of the batch by the current network function and the second time after the treatments of the current network function and before the next hop (next network function).

Concretely, in view of the previous architecture (OpenNetVM), in this embodiment, the grouping operation may consist in arranging the data (pointers) stored in the ring-like data structure so that the packets which have (one or more) common features (characteristics) are grouped in the ring-like data structure (resulting in a temporary break of FIFO paradigm of the ring, during the grouping step).

Thus, as it's been exposed, the present principles allow (any kind) of network function to group packets, according to the packets characteristics, in order to provide at least two subsets of packets, each of these set comprising packets that share common characteristics, these characteristics playing the role of a kind of "fingerprints" that guide the processing of the packets across the various network functions which are implemented in the device.

Even if this first step of grouping (and optionally a second step of grouping) allows increasing the overall speed of the treatments within a network function, several additional optimizations may also speed it with additional efficiency.

6.2.3. Metadata Management.

Another aspect of the present principles relates to the management of metadata associated with the batches of packets. Increasing the speed of the processing of the packets may be done by managing the metadata of the packets one for all, for example at the beginning of the batch. Two various classes of solutions are provided herein above.

The first class of solutions consists in prepending the packet batch with a single, null sized preamble packet with the desired metadata. This situation is depicted in the FIG. 6c: the special null size preamble packet is in black. The metadata associated with the "special packet" takes the place of a regular packet in the shared memory. The current network function may save the metadata that are updated directly in the shared memory if needed. Concretely, in view of the previous architecture (OpenNetVM), in this embodiment, the "special packet" has a pointer in the ring-like data structure. The current network function uses the address (of the pointer in the ring) for accessing to the metadata and updates it if needed.

Upon receipt of this "special" null sized packet, the next network function (the next hop) saves this metadata and drops the special packet. The next network function then manages all subsequent packets arriving on the same ring as if they had the same metadata attached as the one comprised in the "special" null sized packet. Concretely, in view of the previous architecture (Open NetVM), in this embodiment, the "special packet" has a pointer in the ring-like data structure. The next network function consumes this special packet (from the ring-like data structure) as if it was a regular one and notes that it contains only metadata.

A further optimization of the use of the "special" null sized packet above is to save the last metadata sent and avoid sending it again until it changes: that means that the packets of the subset will not be completed with the metadata. The sole packet which comprises metadata is the first one. One thus avoids surcharging packets with metadata. One thus reduces the size of the data.

In a variant of the above first class of solutions, the metadata takes the place of a packet pointer in the ring. This is possible because the packet buffer pointers are typically aligned on 64 byte addresses. Therefore a variable number of bits (that depends on the hardware architecture, allocation library, etc.) of the address remains constant (i.e. equal to 0). The inventors had the idea to set the lowest significant bit to "1" to indicate the fact that the value passed over the ring is a metadata payload and not a packet buffer pointer. The remaining 63 bits contain the actual metadata, structured similarly to the example given above. Upon receipt of such metadata payload, the receiving network function or network function manager simply uses it as previously explained. This first variant is exposed in FIG. 7A. This particular variant exhibits another advantage over the previous variant, allowing the metadata to be pre-fetched as buffer descriptors are read by the recipient network function, instead of doing an indirection to access the metadata of a buffer.

In a further variant, one transports a metadata index instead of the actual payload, which is convenient when the number of possible metadata values is small. The FIG. 7B depicts this variant. Metadata is stored in a table in the shared memory, just like packet buffers. The ring record comprises an indication that it points to the metadata table and comprises an index for accessing the metadata.

Whatever the solution of this first class, the consumption of the metadata by the next network function (next hop) follows the same principles: extraction of the information regarding metadata from the ring and either direct access to the metadata (when the metadata is in the ring) or indirect access via some pointers and addresses (when the ring comprises pointers and/or index and/or addresses).

Figure 6D:
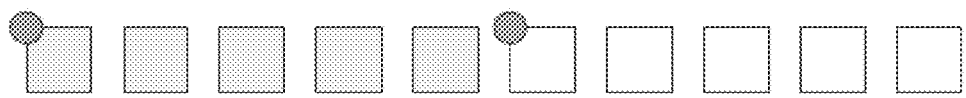

The second class of solutions consists in piggy-backing the first packet of the batch by encoding the metadata as a bitfield and inserting it in the higher bits of the packet buffer address carried by the ring buffer. This second class of solution is depicted in FIG. 6d.

One advantage of the above class of solutions is that it does not increase the number of packets to be sent compared to the number of "real" packets. One disadvantage is that it requires the metadata to be packed into the number of bits unused for defining a memory address. This is typically 6 bits.

While the example describe here uses a network function implementing the NAT function for illustrative purposes, the disclosure applies to all possible network functions but also to a virtual switch or network function manager in charge of forwarding packets between Network functions or sending packets across a physical network. The net effect of transporting a single metadata structure for a batch of packets is that less CPU time is wasted retrieving this information, resulting in more CPU time available for implementing the actual network function. A further advantage for packets sent over a physical network is that it is possible, thanks to the sorting of the packets, to aggregate multiple packets having the same metadata into a smaller number of encapsulated packets.

6.3. Apparatuses

FIG. 8 is a schematic block diagram illustrating an example of a device for processing packets, according to an embodiment of the present disclosure. Such a device may be any device in which the processing of packets acquired by the device has to be managed in a service chaining condition: a computer, a set-top box, a TV set or any portable handheld device such as a smartphone, a tablet for example.

An apparatus PPA illustrated in FIG. 8 includes a processor 801, a storage unit 802 (comprising a shared memory unit for example), an input interface 803, an output interface 804, and optionally a network unit 805 which are connected by a bus 806. Of course, constituent elements of the computer apparatus PPA may be connected by a connection other than a bus connection using the bus 806.

The processor 801 controls operations of the apparatus PPA. The storage unit 802 stores at least one program to be executed by the processor 801, and various data, including for example metadata, set of characteristics or processing rules, parameters used by computations performed by the processor 801, intermediate data of computations performed by the processor 801, and so on. The processor 801 is formed by any known and suitable hardware, or software, or a combination of hardware and software. For example, the processor 801 is formed by dedicated hardware such as a processing circuit, or by a programmable processing unit such as a CPU (Central Processing Unit) that executes a program stored in a memory thereof.

The storage unit 802 is formed by any suitable storage or means capable of storing the program, data, or the like in a computer-readable manner. Examples of the storage unit 802 include non-transitory computer-readable storage media such as semiconductor memory devices, and magnetic, optical, or magneto-optical recording media loaded into a read and write unit. The program causes the processor 801 to process packets, delivering subsets of packets, from at least one set of packets obtained via the input interface, according to an embodiment of the present disclosure as described previously. More particularly, the program causes the processor 802 to group the packets according to common characteristics and to process the subsets according to their metadata. The processing parameters or rules may be stored into storage unit 802.

The input interface 803 is formed for example by a network card for obtaining packets from a network or is formed by a part of the shared memory comprised in the storage unit 802.

The output interface 804 is formed for example by a network card for obtaining packets from a network or is formed by a part of the shared memory comprised in the storage unit 802.

The network unit 805 provides interfaces between the apparatus PPA and external apparatus. The network unit 805 may be a dedicated device or module for managing the process of data.

Although only one processor 801 is shown on FIG. 8, it must be understood that such a processor may comprise different modules (cores) and units embodying the functions carried out by apparatus PPA according to embodiments of the present disclosure, such as modules allowing determining common features of packets, processing means, etc.

These modules and units may also be embodied in several processors 801 communicating and co-operating with each other.

The invention claimed is:

1. A method for packet processing, implemented by a packet processing device configured to be connected to a communication network from which said packet processing device receives and/or transmits packets, the method comprising:
obtaining a set of packets, the packets of said set of packets comprising at least one common characteristic;
first grouping said packets of said set of packets according to said at least one common characteristic, forming at least two groupings of packets;
adding, to at least one of said groupings of packets, metadata common to the packets of said at least one grouping of packets by generating a single metadata structure associated with said packets of at least one grouping of packets;
modifying at least one order of pointers of the packets of said set of packets, within a ring data structure stored in a shared memory area of the packet processing device, so that the pointers of the packets having a common characteristic are concomitant within the ring data structure; and
sequentially processing said at least two groupings of packets;
wherein the at least one common characteristic includes at least one of a source address of the packets, a destination address of the packets, and a destination port of the packets.

2. The method according to claim 1, further comprising: subsequent to sequentially processing said at least two groupings of packets grouped, second grouping said packets of said set of packets as a function of at least a second common characteristic, delivering at least one further grouping of packets.

3. The method according to claim 1, further comprising: subsequent to the first grouping, at least one adding, for at least one grouping, a record containing metadata common to the packets of said grouping of packets.

4. The method, according to claim 3, wherein said record containing said metadata is added within a ring data structure of pointers, comprising addresses of each packet of said grouping of packets in a shared memory area of the packet processing device.

5. The method according to claim 1, further comprising: subsequent to said first grouping of said packets of said set of packets, at least one adding, within a ring data structure of pointers, for at least one grouping of packets, of a record containing a pointer to a shared memory area of the packet processing device, the shared memory area comprising metadata common to the packets of said grouping of packets.

6. The method, according to claim 1, wherein said packet processing device comprises at least one processor comprising at least two cores, said grouping being implemented so that a first grouping of packets is processed by a first core and a second grouping of packets is processed by a second core.

7. The method of claim 1, wherein the at least one characteristic further includes at least one of a Virtual Local Area Network (LAN) identifier, a Virtual Extensible LAN identifier, a tunnel identifier, a protocol associated with the packet, and existing metadata of the packets.

8. A packet processing device configured to be connected to a communication network from which said packet processing device is configured to receive and/or transmit packets, the packet processing device comprising:
a processor; and
a memory, wherein said processor and memory are configured to:
obtain a set of packets, each packet of said set of packets comprising at least one common characteristic;
group said packets of said set of packets according to said at least one common characteristic, forming at least two groupings of packets;
add to at least one of said groupings of packets, metadata common to the packets of said at least one grouping of packets by generating a single metadata structure associated with said packets of at least one grouping of packets;
modify at least one order of pointers of the packets of said set of packets, within a ring data structure stored in a shared memory area of the packet processing device, so that the pointers of the packets having a common characteristic are concomitant within the ring data structure; and
sequentially process said at least two groupings of packets;
wherein the at least one common characteristic includes at least one of a source address of the packets, a destination address of the packets, and a destination port of the packets.

9. The packet processing device according to claim 8, further configured so that subsequent to the sequentially processing said at least two groupings of packets grouped, a second grouping of said packets of said set of packets as a function of at least a second common characteristic occurs, delivering at least one grouping of packets.

10. The packet processing device according to claim 8, further configured so that subsequent to said grouping, at least one adding operation, for at least one grouping of packets, of a record containing metadata common to the packets of said grouping of packets occurs.

11. The packet processing device to claim 8, wherein said processor comprises at least two cores, said configuration for grouping being implemented so that a first grouping of packets is processed by a first core and a second grouping of packets is processed by a second core.

12. A computer program product comprising computer executable program code recorded on a computer readable non-transitory storage medium, the computer executable program code when executed, performing any method according to claim 1.

13. The packet processing device according to claim 8, wherein the at least one characteristic further includes at least one of a Virtual Local Area Network (LAN) identifier, a Virtual Extensible LAN identifier, a tunnel identifier, a protocol associated with the packet, and existing metadata of the packets.

* * * * *